C. G. BUSH.
Object-Boxes for Kaleidoscopes.

No. 151,006. Patented May 19, 1874.

Witnesses.
Geo. T. Smallwood, Jr.
C. Hickmoops

Inventor.
Charles G. Bush,
by John J. Halsted,
his Atty.

AM. PHOTO-LITHOGRAPHIC Co. N.Y. (OSBORNE'S PROCESS.)

UNITED STATES PATENT OFFICE.

CHARLES G. BUSH, OF BOSTON, MASSACHUSETTS, ASSIGNOR TO HIMSELF AND JOHN W. HOARD, OF PROVIDENCE, RHODE ISLAND.

IMPROVEMENT IN OBJECT-BOXES FOR KALEIDOSCOPES.

Specification forming part of Letters Patent No. 151,006, dated May 19, 1874; application filed March 20, 1874.

*To all whom it may concern:*

Be it known that I, CHAS. G. BUSH, of Boston, Massachusetts, have invented an Improvement in Object-Boxes for Kaleidoscopes, of which the following is a specification:

My invention consists in making the object-box of a kaleidoscope with an opening, and a cover for the same, for the ready introduction into or removal of the objects from the box, thus avoiding the necessity, as the boxes have been heretofore constructed, of taking the whole apparatus apart, and removing one of the glasses of the box, and then putting the parts together again.

Figure 1:
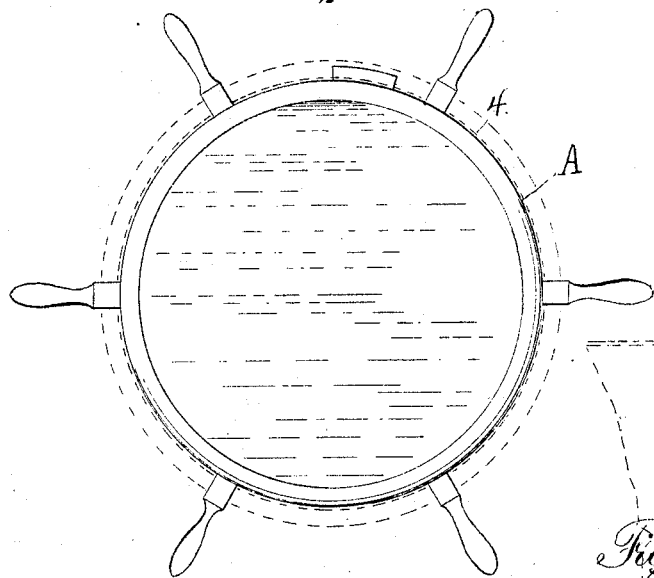
Figure 2:
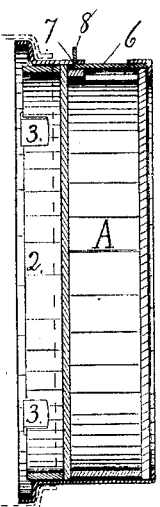
Figure 3:
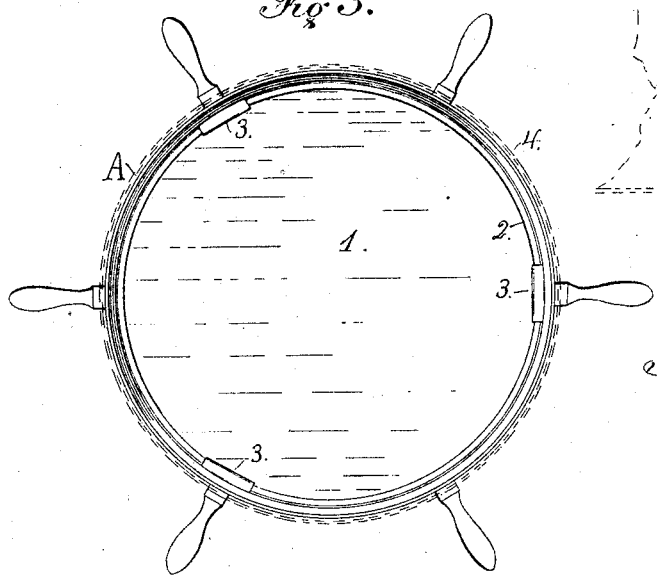
Figure 4:
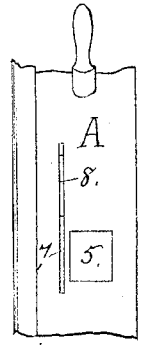

In the drawings making part of this specification, Figure 1 is an exterior plan view of my improved box for containing the movable objects; Fig. 2, a central cross-section of the same through the opening and its cover; Fig. 3, an interior plan view of the box; and Fig. 4 a section, showing a plan of the opening and its removable cover.

A is the object-box, made mainly in the usual manner, with a glass disk at each end, the inner glass 1 being held to place in a well-known manner by a circular band, 2, usually made of pasteboard, and which is held down by bent metal clasps 3. This box is connected to a rim, 4, shown in dotted lines, which is preferably screwed to the case. These parts are not new, but described for the purpose of stating that, in order to remove any of the objects from the box or to put others in, it is now necessary, first, to unscrew or detach the rim from the case; next, to insert the hand or an implement within the rim and pry up each of the metal clasps which hold the band 2 to its place against the inner glass; and, next, to pry up the glass by its edge at the risk of breaking it before any of the objects can be changed or a new set substituted. The refastening of these parts together again after changing the objects repeats the labor, inconvenience, and risk, and after a few bendings and rebendings the clasps are apt to break. The risk of breakage is, however, still greater when the rim 4 is made of glass to illuminate opaque objects, as in my application filed December 20, 1873, not only because it is of fragile material, but also because such glass rims are made deeper than when metallic ones are used, and hence the greater difficulty of inserting either the hand or a tool within it after it is detached from the case to get access to the objects. Now, to avoid taking this apart and reconstructing, I cut an opening, 5, in the periphery or metallic part of the box, and also through the pasteboard band, large enough to put in or take out any desired object, and then provide such opening with any suitable cap or cover, which may be readily made to uncover or cover the opening at option.

I have represented in the drawings as a suitable and efficient cover a slide, 6, of thin sheet metal, held to place between the inside of the periphery of the box and its pasteboard or other inner band and the edge of the outer glass disk, and through a long slit, 7, in the box, a shorter bent edge, 8, of this slide projects so as to permit it to be easily pushed at will to cover or uncover the opening. The friction of the parts is found to be sufficient to keep the slide in place.

It is evident that the cover might be fastened to the box by a rivet, so as to turn upon it, and so be swung over or away from the opening, or it might be hinged and be secured by a notch or catch. These are obvious equivalents of the slide, and any other well-known form of cover may be employed without departing from the spirit of my invention.

I claim—

A kaleidoscope object-box, provided with an opening and movable cover therefor, substantially as and for the purpose set forth.

CHARLES G. BUSH.

Witnesses:
CHARLES SELDEN,
JOHN C. PURKIS.